(12) United States Patent
Scheur et al.

(10) Patent No.: US 10,565,304 B2
(45) Date of Patent: Feb. 18, 2020

(54) SYSTEM AND METHOD FOR IMPLEMENTING A PROFICIENCY-DRIVEN FEEDBACK AND IMPROVEMENT PLATFORM

(71) Applicant: NOREDINK CORP., San Francisco, CA (US)

(72) Inventors: Jeff Scheur, San Francisco, CA (US); Jocelyn Karlan, San Francisco, CA (US); Joshua Leven, San Francisco, CA (US)

(73) Assignee: NoRedInk Corp., San Francisco, CA (US)

( * ) Notice: Subject to any disclaimer, the term of this patent is extended or adjusted under 35 U.S.C. 154(b) by 0 days.

(21) Appl. No.: 15/706,701

(22) Filed: Sep. 16, 2017

(65) Prior Publication Data

US 2019/0087404 A1  Mar. 21, 2019

(51) Int. Cl.
*G06F 17/27* (2006.01)
*G10L 15/22* (2006.01)
*G10L 15/187* (2013.01)

(52) U.S. Cl.
CPC .......... *G06F 17/274* (2013.01); *G06F 17/271* (2013.01); *G06F 17/273* (2013.01); *G10L 15/22* (2013.01); *G06F 17/2775* (2013.01); *G10L 15/187* (2013.01)

(58) Field of Classification Search
CPC ...................................... G06F 17/02
USPC .................................. 704/1, 9, 10
See application file for complete search history.

(56) References Cited

U.S. PATENT DOCUMENTS

| | | | |
|---|---|---|---|
| 2006/0040247 A1* | 2/2006 | Templin | G09B 7/00 434/362 |
| 2008/0077859 A1 | 3/2008 | Schabes | |
| 2011/0264691 A1* | 10/2011 | Migita | G06Q 10/00 707/769 |
| 2012/0185358 A1* | 7/2012 | Ajjarapu | G06Q 30/06 705/26.62 |
| 2013/0040275 A1* | 2/2013 | Gowda | G09B 5/06 434/322 |
| 2015/0161106 A1* | 6/2015 | Barbetta | G06F 17/28 434/362 |
| 2016/0246772 A1 | 8/2016 | Hoover | |
| 2018/0165653 A1* | 6/2018 | Rahn | G06Q 10/1095 |

* cited by examiner

*Primary Examiner* — Jesse S Pullias
(74) *Attorney, Agent, or Firm* — Jim H. Salter; Inventive Law Inc.

(57) ABSTRACT

A system and method for implementing a proficiency-driven feedback and improvement platform is disclosed. A particular embodiment includes: establishing a data connection with a learner; generating a distribution of questions to determine the learner's level of proficiency on a topic, the topic being composed of a set of codes and counter-codes; determining the learner proficient on the topic after the learner has demonstrated proficiency on each code and counter-code within the topic; and distributing questions to the learner on codes and counter-codes within the topic until the learner has demonstrated proficiency on each code and counter-code within the topic. A particular embodiment further includes: providing the learner feedback on work according to a set of criteria; and ensuring that only users who have first demonstrated proficiency on one or more criteria in the set of criteria can give feedback on those criteria.

14 Claims, 13 Drawing Sheets

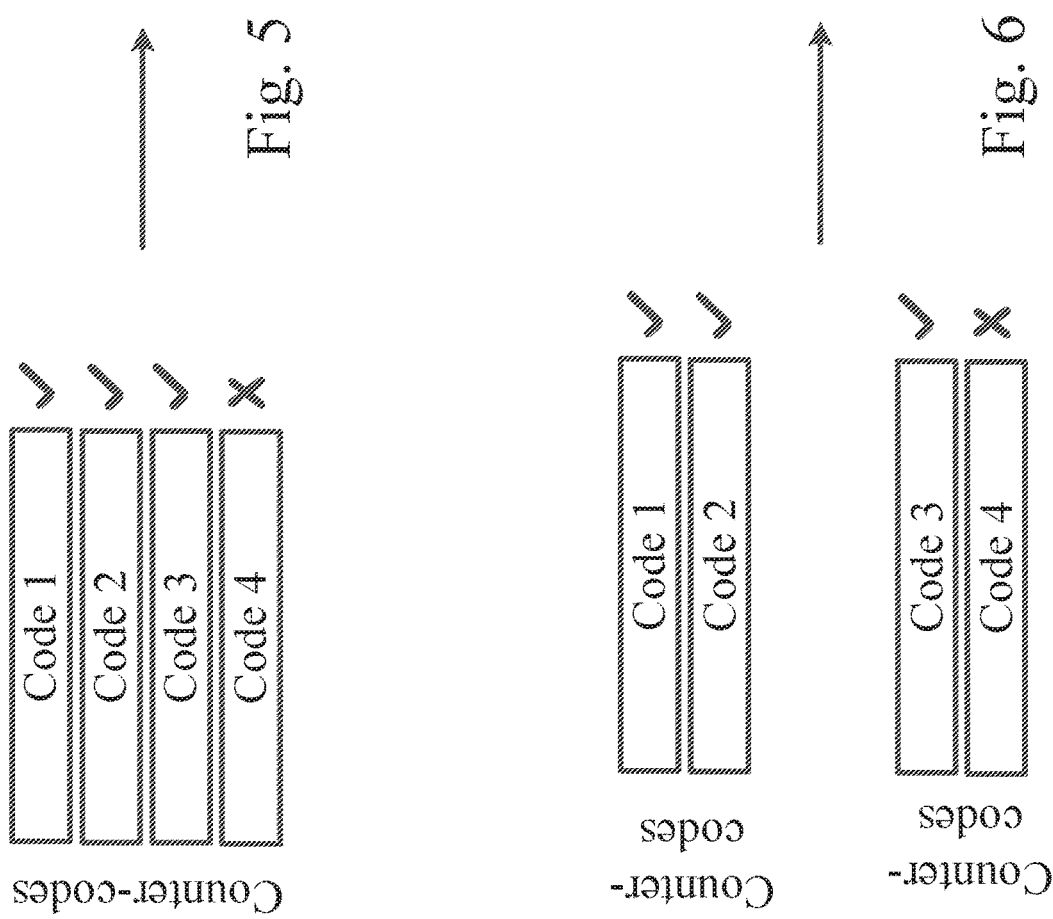

The thesis statement below is...

Although most scientists agree that climate change is real, some Americans are still skeptical.

[ Fact ]    [ Opinion ]

Rate your classmate's thesis statement

Talent is not an important issue in my opinion.

[ Opinion ]  or  [ Fact ]

I don't know

SYSTEM AND METHOD FOR IMPLEMENTING A PROFICIENCY-DRIVEN FEEDBACK AND IMPROVEMENT PLATFORM

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016-2017 NoRedInk Corp., All Rights Reserved.

TECHNICAL FIELD

This patent application relates to computer-implemented software systems, computer-network enabled systems, and user interfaces, according to one embodiment, and more specifically to a system and method for implementing a proficiency-driven feedback and improvement platform.

BACKGROUND

Helping learners make demonstrated gains in a given subject area has long been constrained by the time, effort, and expertise required to effectively assess learners' work and help them improve. These factors are among the most significant deterrents to learning.

SUMMARY

The example embodiments disclosed herein provide a proficiency-assessment platform that generates a distribution of questions to evaluate a learner's level of proficiency on a set of juxtaposing sub-skills (referred to herein as "codes" and "counter-codes"), such that a learner will continue to answer questions on each code and counter-code until the learner has demonstrated proficiency on all of them, in order to most accurately determine the learner's level of proficiency on a topic composed of that set of sub-skills.

The example embodiments disclosed herein also provide a proficiency-driven feedback and improvement platform to allow learners to submit work and receive feedback from other learners who have first demonstrated proficiency through the platform on one or all of a set of criteria related to that work.

BRIEF DESCRIPTION OF THE DRAWINGS

The various embodiments are illustrated by way of example, and not by way of limitation, in the figures of the accompanying drawings in which:

FIGS. 5 and 6 illustrate examples of the processing performed by the proficiency-assessment module of an example embodiment;

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments, a system and method for implementing a proficiency-driven feedback and improvement platform is disclosed. In various example embodiments, a computer-implemented tool is described to provide such a proficiency-driven feedback and improvement platform. The example embodiments disclosed herein allow learners to submit work into a digital platform, practice concepts designed to help them strengthen a particular set of skills, receive feedback from other learners who have demonstrated proficiency on some or all of those skills and/or feedback from an instructor, give feedback themselves on criteria on which they have demonstrated proficiency, and leverage the feedback they have received to revise and improve their own work.

Figure 1:
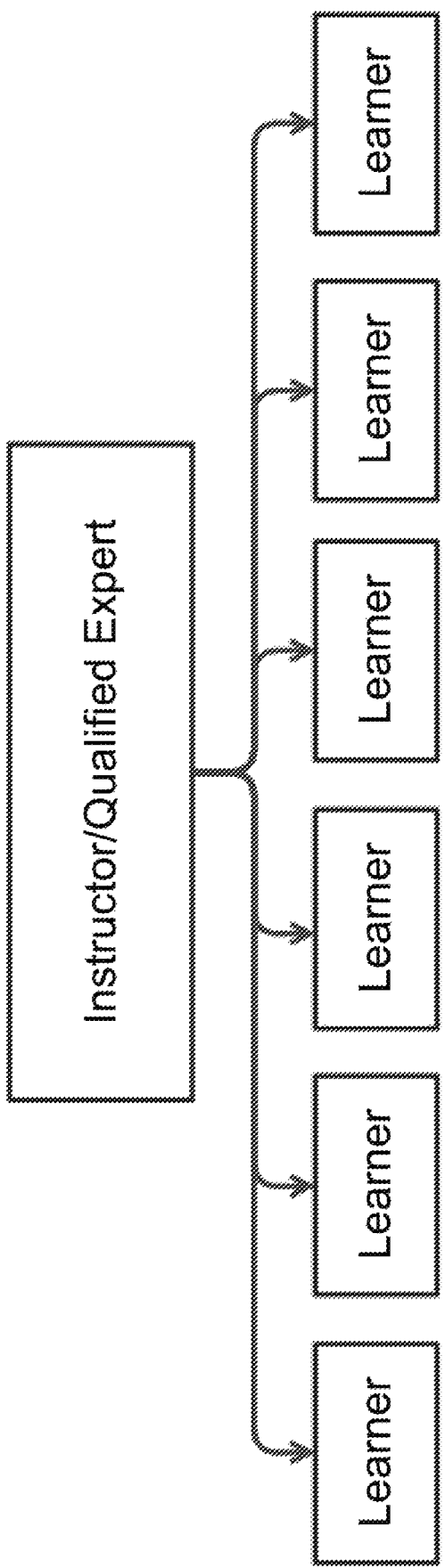
FIG. 1 illustrates the traditional teaching and learning model.

Referring now to FIG. 1, the existing teaching and learning model in schools, as shown, relies heavily on the instructor/qualified expert to impart feedback that will result in performance gains for a plurality of learners. This model creates an excessive burden on the instructor and creates a significant lag in the time between submission of work and receipt of feedback, making feedback less helpful and actionable. Traditional solutions have often proven inadequate at actually driving improvement.

Figure 2:
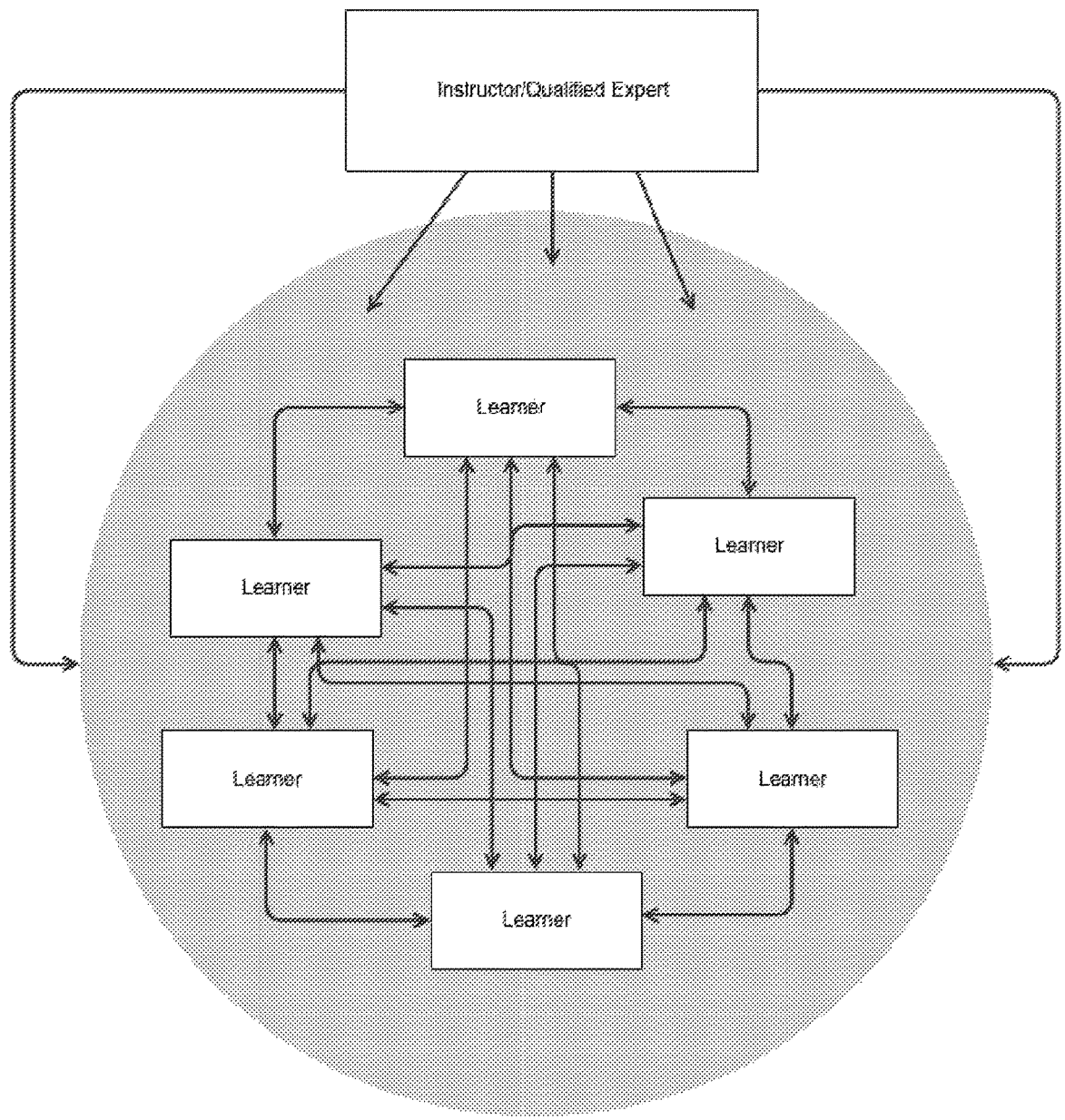
FIG. 2 illustrates the structural relationship between learners and an instructor/qualified expert in the proficiency-driven feedback and improvement system of an example embodiment.

Referring now to FIG. 2, the example embodiments disclosed herein provide a proficiency-driven feedback and improvement system 101 that allows learners to submit work into a digital platform. The digital platform 101 of an example embodiment enables proficiency-driven feedback between learners, facilitated by the online platform 101. The example embodiment also enables an instructor/qualified expert to monitor the work of the learners, view the feedback that learners have left for each other, leave learners feedback, assign revisions, and/or grade or assess learners' submission, all of which is facilitated by the platform. Unlike in FIG. 1, learners can be both sources and receivers of feedback using the proficiency-driven feedback and improvement system 101.

While the various example embodiments described herein may refer to learners and instructors/qualified experts, it should be understood that the present invention is not limited to any particular learning structure or hierarchy, nor is it limited to any one particular skill. The present invention can be applied with or without any instructor, and it may be applied in any situation where feedback is useful, including without limitation various forms of writing, reading, speaking, mathematics, science, language acquisition or improvement, critical thinking, and performing and creative arts. It may be effectively applied in any context where visual, written, audio, or other forms of feedback can help one improve.

The example embodiments provide a system and method for improving a learner's work that is unique. In contrast to other solutions, the example embodiments disclosed herein improve performance by providing a proficiency-driven feedback and improvement system that:

removes the instructor/qualified expert as the sole source of feedback. In many learning environments, learners only receive one source of feedback from an instructor who may simultaneously have to provide feedback to many other learners, causing the feedback to be rushed and of low quality, the learners to wait for an extended time period receive it, and the resulting performance gains from the feedback to be inadequate teaches learners how to analyze work according to a guided set of criteria. The disclosed example embodiments improve learners' skills as they first practice concepts designed to strengthen their understanding and then further enhance those skills through the act of giving feedback on the criteria on which they have demonstrated proficiency.

provides learners with a higher level of qualitative feedback. Unlike fully auto-graded solutions, which are more adept at pointing out surface-level errors on learners' original work, the disclosed embodiments foster in-depth, more valuable feedback to learners.

The disclosed proficiency-driven feedback and improvement platform ensures that learner feedback is accurate and of high quality. In various example embodiments, either or both of two main concepts are involved in this process of proficiency-driven feedback and improvement: 1) a proficiency-assessment process, and 2) a proficiency-driven feedback and improvement process. These processes and their related systems and technical implementation are described in more detail below. It should be understood that these two processes can be used independently or together as appropriate.

In various example embodiments, a system and method for implementing a proficiency-driven feedback and improvement platform are disclosed. In the various example embodiments described herein, a computer-implemented tool or software application (app) implements the proficiency-driven feedback and improvement platform 101. As described in more detail below, a computer or computing system on which the described embodiments can be implemented can include personal computers (PCs), portable computing devices, laptops, tablet computers (e.g., iPad™), personal digital assistants (PDAs), personal communication devices (e.g., cellular telephones, smartphones, or other wireless devices), network computers, set-top boxes, servers, mainframe computers, wearable computing devices, Internet-of-Things (IoT) devices, or any other type of computing, data processing, communication, networking, or electronic system. The network can include any local-area network or wide-area network, such as the Internet.

Figure 3:
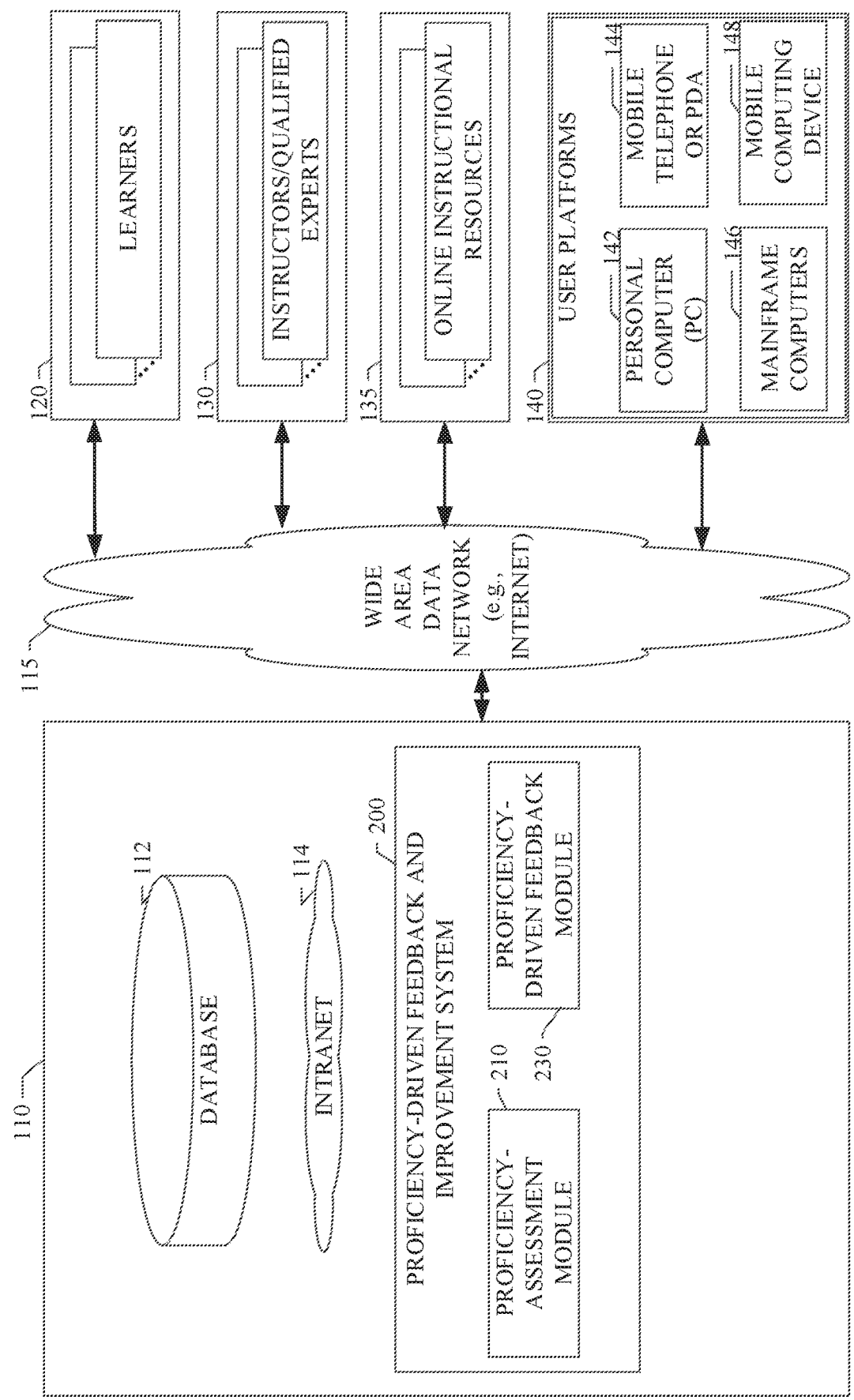
FIG. 3 illustrates an example embodiment of a system in which various embodiments may operate.

FIG. 3, in an example embodiment, illustrates a system for implementing a proficiency-driven feedback and improvement platform 101. In various example embodiments, an application or service, typically provided by or operating on a host site (e.g., a website) 110, is provided to simplify and facilitate the downloading or hosted use of the proficiency-driven feedback and improvement system 200 of an example embodiment. In a particular embodiment, the proficiency-driven feedback and improvement system 200 can be downloaded from the host site 110 by a user at a user platform 140. Alternatively, the proficiency-driven feedback and improvement system 200 can be hosted by the host site 110 for a networked user at a user platform 140. The details of the proficiency-driven feedback and improvement system 200 for an example embodiment are provided below.

Referring again to FIG. 3, the proficiency-driven feedback and improvement system 200 can be in data communication with a plurality of learner devices 120, a plurality of instructor/qualified expert user devices 130, and/or a plurality of online instructional resources 135. The learners can include self-directed individuals, individuals receiving individual instruction, or individuals attending classes, seminars, online forums, or another academic or educational event, whether attending physically or virtually. The proficiency-driven feedback and improvement system 200 can be configured to obtain the information provided by or available from the learner devices 120 in a digital or computer-readable form via the network 115. The proficiency-driven feedback and improvement system 200 can also be in data communication with a plurality of instructor/qualified expert user devices 130. The instructors/qualified experts can include individuals providing instruction or hosting classes, seminars, or other academic or educational events, whether attending physically or virtually. The proficiency-driven feedback and improvement system 200 can be configured to obtain information provided by or available from the instructor/qualified expert devices 130 in a digital or computer-readable form via the network 115. The proficiency-driven feedback and improvement system 200 can also be in network data communication with a plurality of online instructional resources 135. The plurality of online instructional resources 135 can include websites, academic resource or content sites, library or information content sites, or other network resources at which information related to the topics of the academic or educational event is available. The proficiency-driven feedback and improvement system 200 can be configured to obtain the information content available from the plurality of online instructional resources 135 in a digital or computer-readable form via the network 115.

One or more of the plurality of learner devices 120, the plurality of instructor/qualified expert user devices 130, and/or the plurality of online instructional resources 135 can be grouped together and provided by one or more third party providers operating at various locations in a digital ecosystem. It will be apparent to those of ordinary skill in the art that the plurality of learner devices 120, the plurality of instructor/qualified expert devices 130, and the plurality of online instructional resources 135 can be enabled by any of a variety of networked third party information providers, websites, network-accessible information nodes, or other network resources as described in more detail below. In a particular embodiment, a resource list maintained at the host site 110 can be used as a registry or list of all learner devices 120, instructor/qualified expert devices 130, and online instructional resources 135, which users or the host site 110 may visit/access and from which users or the host site 110 can obtain or submit information content. The host site 110, learner devices 120, instructor/qualified expert devices 130, or online instructional resources 135, and user platforms 140 may communicate and transfer data and information in the data network ecosystem shown in FIG. 3 via a wide-area data network (e.g., the Internet) 115. Various components of the host site 110 can also communicate internally via a conventional intranet or local-area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide-area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide-area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business or educational facility data center, for example.

The learner devices 120, instructor/qualified expert devices 130, and/or the online instructional resources 135 may include any of a variety of providers or consumers of digital data. The digital data can be transported in any of a family of file formats and associated mechanisms usable to enable a host site 110 and/or a user platform 140 to receive information from or transfer information to learner devices 120, instructor/qualified expert devices 130, and/or online instructional resources 135 over the network 115. In various embodiments, the file format can be a HyperText Markup Language (HTML) format, a WordPress™ format, a Microsoft™ Word text format, a Microsoft™ Excel spreadsheet format, a CSV (Comma Separated Values) format, or the like; however, the various embodiments are not so limited, and other file formats and transport protocols may be used. For example, data formats other than Excel or CSV or formats other than open/standard formats can be supported by various embodiments. Any electronic file format, such as Microsoft™ Access Database Format (MDB), Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, learner devices 120, instructor/qualified expert devices 130, and/or the online instructional resources 135 may provide or consume a variety of different data sets.

In a particular embodiment, a user platform 140 with one or more client devices enables a user to access data provided by the proficiency-driven feedback and improvement system 200 via the host 110 and network 115. Any of the learner devices 120 or the instructor/qualified expert devices 130 can be implemented as user platforms 140. Client devices of user platform 140 may include virtually any computing device that is configured to send and receive information over a network, such as network 115. Such client devices may include portable devices 144, such as, cellular telephones, smart phones, display pagers, radio frequency (RF) devices, infrared (IR) devices, global positioning devices (GPS), Personal Digital Assistants (PDAs), handheld computers, IoT devices, wearable computers, tablet computers, integrated devices combining one or more of the preceding devices, and the like. The client devices may also include other computing devices, such as personal computers 142, multiprocessor systems, microprocessor-based or programmable consumer electronics, network PC's, and the like. The client devices may also include other processing devices, such as servers or mainframe computers 146 and/or mobile computing devices 148, which are known to those of ordinary skill in the art. As such, the client devices of user platform 140 may range widely in terms of capabilities and features. Moreover, the web-enabled client device may include a browser application enabled to receive and to send network transportable data content and executable or interpretable instructions, wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive information content and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 3, the proficiency-driven feedback and improvement system 200 for an example embodiment is shown to include a database 112. The database 112 can be used to retain a variety of information data sets including, but not limited to, network resource information, user information, user instructional content, information view configurations, information view templates, user document configuration information, user-generated content, and the like. It will be apparent to those of ordinary skill in the art that the database 112 can be locally resident at the host site 110 or remotely located at other server locations or stored in network cloud storage.

Referring again to FIG. 3, host site 110 of an example embodiment is shown to include the proficiency-driven feedback and improvement system 200. In an example embodiment, proficiency-driven feedback and improvement system 200 may include a proficiency-assessment module 210 and/or a proficiency-driven feedback module 230. These modules can be implemented as software components executing within an executable environment of the proficiency-driven feedback and improvement system 200 operating on host site 110 or user platform 140. Each of these modules of an example embodiment is described in more detail below in connection with the figures provided herein.

The proficiency-driven feedback and improvement system 200 may include a proficiency-assessment module 210. The proficiency-assessment module 210 can be configured to perform the processing as described herein. Initially, the proficiency-assessment module 210 can be configured to establish a data connection with at least one of the plurality of learner devices 120, at least one of the plurality of instructor/qualified expert devices 130, and optionally one or more of the plurality of online instructional resources 135. The proficiency-assessment module 210 can be configured to generate and display on a user interface of a user platform 140 information content and at least one user-selectable input object or icon associated with available user-selectable option elements of a pre-defined set of user-selectable option elements as described in more detail below.

The proficiency-assessment module 210 can be further configured to gather and process information pertaining to each learner. The learner information is processed to assess each learner's level of understanding. In various example embodiments, a proficiency-assessment process uses adaptive technology to gauge each learner's understanding of concepts as he or she works toward proficiency. This process is unique in its ability to accurately assess learners' proficiency of intertwined and related skills.

Figure 9:
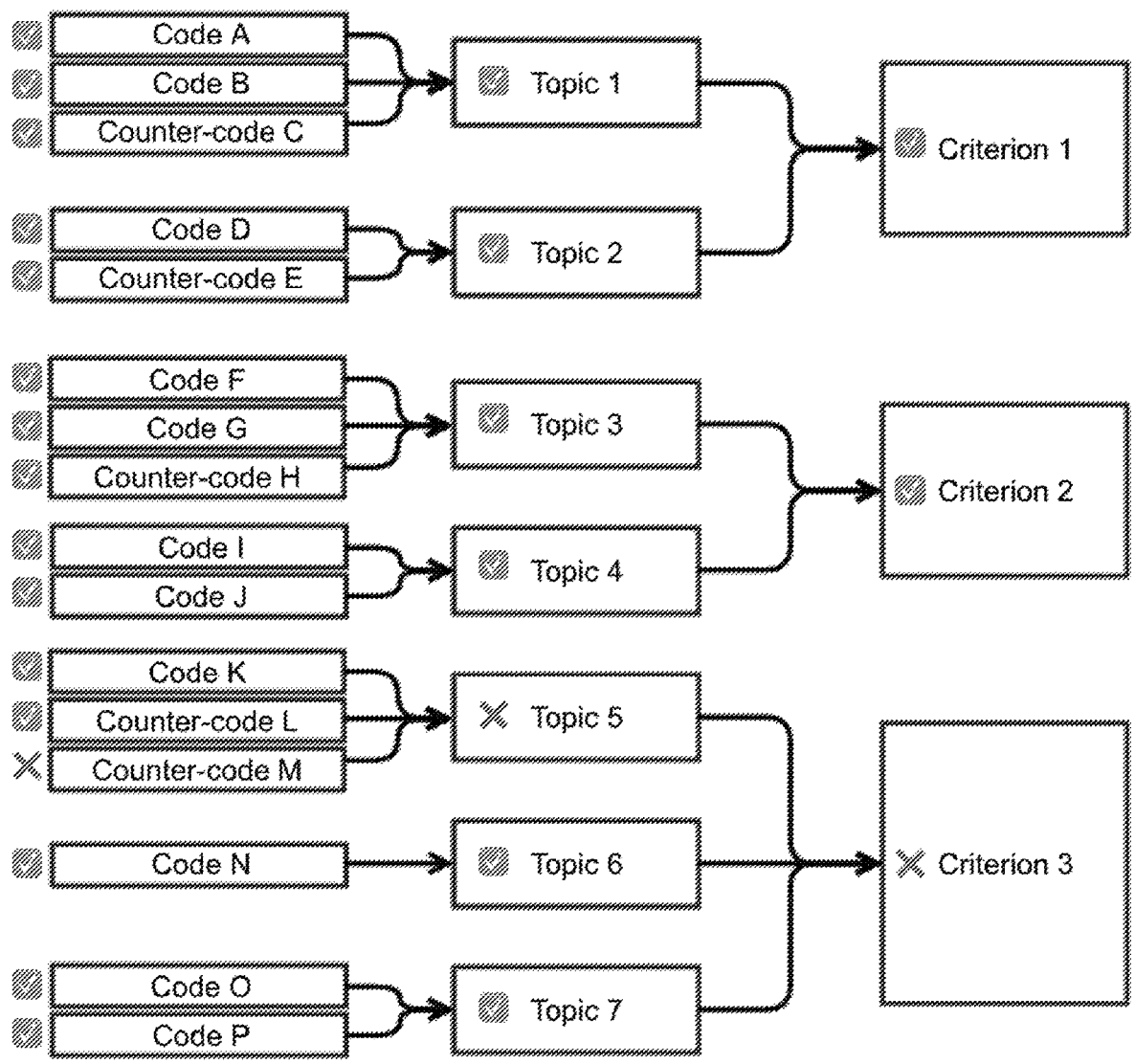
FIG. 9 illustrates the relationship between "codes and counter-codes," "topics," and "criteria" of an example embodiment of the proficiency-assessment module, whereby a learner who demonstrates proficiency on topics is enabled to provide feedback to other learners on the criteria associated with those topics.

Referring now to FIG. 9, example embodiments may include a system by which a learner or learners evaluate another learner according to one or more criteria; a system by which a learner's ability to evaluate other learners on a single criterion may be determined by his or her demonstrated proficiency on one or more concepts or "topics"; and/or a system by which a learner's proficiency on a topic may be determined by his or her demonstrated proficiency on a specific skill or "code" and juxtaposed but related skills, or "counter-codes."

Figure 4:
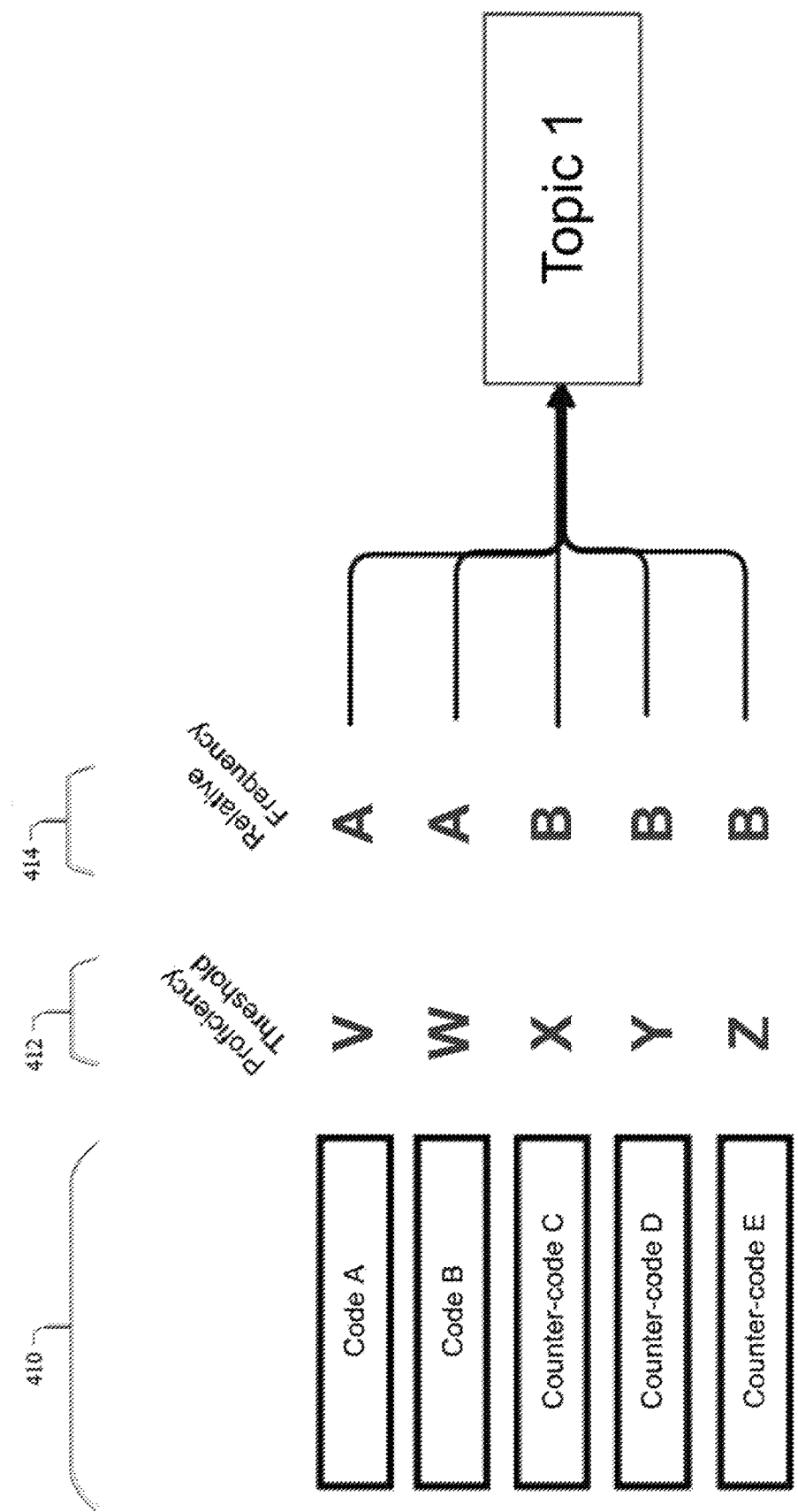
FIG. 4 illustrates a subset of inputs related to each topic of instruction.

Referring now to FIGS. 4 through 6, examples are illustrated of the processing that may be performed by an example proficiency-assessment module 210 for assessing the skills and level of proficiency of each learner on one or more topics of instruction. For each topic of instruction, the proficiency-assessment module 210 tracks a collection of information related to the skills for each learner to ensure complete and accurate learner comprehension. This process prevents a learner from getting questions correct when tested in isolation, only to later be unable to apply those concepts in authentic situations because his or her understanding of the material was surface-level and un-nuanced.

Referring now to FIG. 4, in one example embodiment, the proficiency-assessment module 210 considers among four inputs when determining which questions to display to a learner on a given "topic" of instruction:

the relationship 410 between juxtaposing skills, referred to here as "codes" and their "counter-codes," within the topic. These sets of codes and counter-codes 410 may be assessed together to ensure that learners do not falsely extrapolate patterns.

the necessary threshold 412 for demonstrating proficiency of each skill. The threshold for demonstrating proficiency 412 may vary based on the difficulty and complexity of each skill.

the relative frequency 414 to assess each skill. This relative frequency ratio 414 is also intended to mirror the desired emphasis in the topic.

the difficulty of all questions available on the site. The proficiency-assessment module 210 can calculate the difficulty of questions based on a collection (e.g., billions) of prior attempts from learners on answering the questions.

In various example embodiments, the proficiency-assessment module 210 may use the inputs described above to generate a customized set of questions for each learner on a topic. The questions can be presented to each learner by the proficiency-assessment module 210 via the user interface of a user platform 140 as described above. The customized set of questions may be generated and presented for each learner such that each learner receives a mix of questions from codes and their counter-codes. The questions presented may also vary in difficulty depending on learner performance, such that learners see easier questions after making errors and harder questions after answering correctly. Learners may ultimately interact with progressively more difficult questions on each code or counter-code until they have demonstrated a desired level of proficiency on each one. The learner may continue to work on the topic until he or she has demonstrated proficiency on all codes and counter-codes within the topic.

In various example embodiments, the proficiency-assessment module 210 ensures that:
- learners are not "finished" until they have shown understanding of all necessary codes and their counter-codes.
- learners see gradually more difficult questions as they answer correctly, and are guided toward slightly easier questions when they are struggling.
- learners see questions from all codes in the topic in randomized fashion so that learners cannot "hack" their way to completion (e.g., by answering all questions on one code, where the answer always follows a particular pattern, and then answering all questions on another code, where the answer always follows the opposite pattern). In various example embodiments, the proficiency-assessment module 210 can oscillate between codes, emphasizing codes on which the learner has not demonstrated proficiency (while also assessing any counter-codes, even if the learner has demonstrated proficiency on those), and still ensuring that there is no predictable pattern to the questions being displayed.
- as learners gain proficiency on individual codes in a topic, they still see questions from a given code until they have demonstrated proficiency on that code and all its counter-codes. In a given topic, if there are two sets of codes and counter-codes, one called set A and one called set B (see FIG. 6 for reference), learners will continue to see questions from all codes and counter-codes in Set A until learners demonstrate proficiency on all codes and counter-codes in Set A.

As such, the proficiency-assessment module 210 uses each topic's codes and counter-codes to generate customized sets of questions presented to learners via the user interface for assessing the skills and level of proficiency of each learner on one or more topics of instruction. FIGS. 5 and 6 illustrate two examples of this process for question generation.

Referring now to FIG. 5, an example illustrates the type of processing performed by the proficiency-assessment module 210. In this example, codes 1, 2, 3, and 4 on a topic are all counter-codes of each other, and a learner has demonstrated proficiency of codes 1, 2, and 3 by correctly answering questions from each code. The learner has not yet, however, demonstrated proficiency on code 4. In this sample case, the proficiency-assessment module 210 generates questions from code 4 x % of the time and questions from codes 1, 2, and 3, the other (100-x)% of the time while ensuring that questions do not alternate in a predictable pattern. The proficiency-assessment module 210 can ensure that when the learner answers a question correctly from code 4, the next question he or she encounters from that code will be more difficult than the previous one from that code. The same can be said for the learner encountering a less difficult question from code 4 subsequent to getting a code 4 question incorrect. The proficiency-assessment module 210 can continue to oscillate questions among all codes in the manner described above until the learner has demonstrated proficiency on all codes in the topic.

Referring now to FIG. 6, another example illustrates the processing performed by the proficiency-assessment module 210. As shown in FIG. 6, the example shows that a particular learner has demonstrated proficiency on topic codes 1, 2, and 3 by correctly answering questions related to these three codes. However, in this example, codes 1 and 2 are counter-codes of each other and codes 3 and 4 are counter-codes of each other. In this sample case, if the learner has demonstrated proficiency on codes 1, 2, and 3, the proficiency-assessment module 210 can generate questions from code 4 x % of the time and questions from code 3 the other (100-x)% of the time while ensuring that questions do not alternate in a predictable pattern. The proficiency-assessment module 210 can ensure that when the learner answers a question correctly from code 4, the next question he or she encounters from that code will be more difficult than the previous one from that code. The same can be said for the learner encountering a less difficult question from code 4 subsequent to getting a code 4 question incorrect. The proficiency-assessment module 210 can continue to oscillate questions among all codes in the manner described above until the learner has demonstrated proficiency on all codes in the topic.

Referring again to FIG. 3, the proficiency-driven feedback and improvement system 200, with a proficiency-assessment module 210 and/or a proficiency-driven feedback module 230 therein, can be configured to perform the processing as described herein. Initially, the proficiency-driven feedback and improvement system 200 can be configured to establish, by use of a data processor and the data network 115, a network data connection with at least one of the plurality of learner devices 120, at least one of the plurality of instructor/qualified expert devices 130, and optionally one or more of the plurality of online instructional resources 135. The proficiency-driven feedback and improvement system 200 can be configured to generate and display on a user interface of a user platform 140 information content and at least one user-selectable input object or icon associated with available user-selectable option elements of a pre-defined set of user-selectable option elements as described in more detail below.

Figure 7:
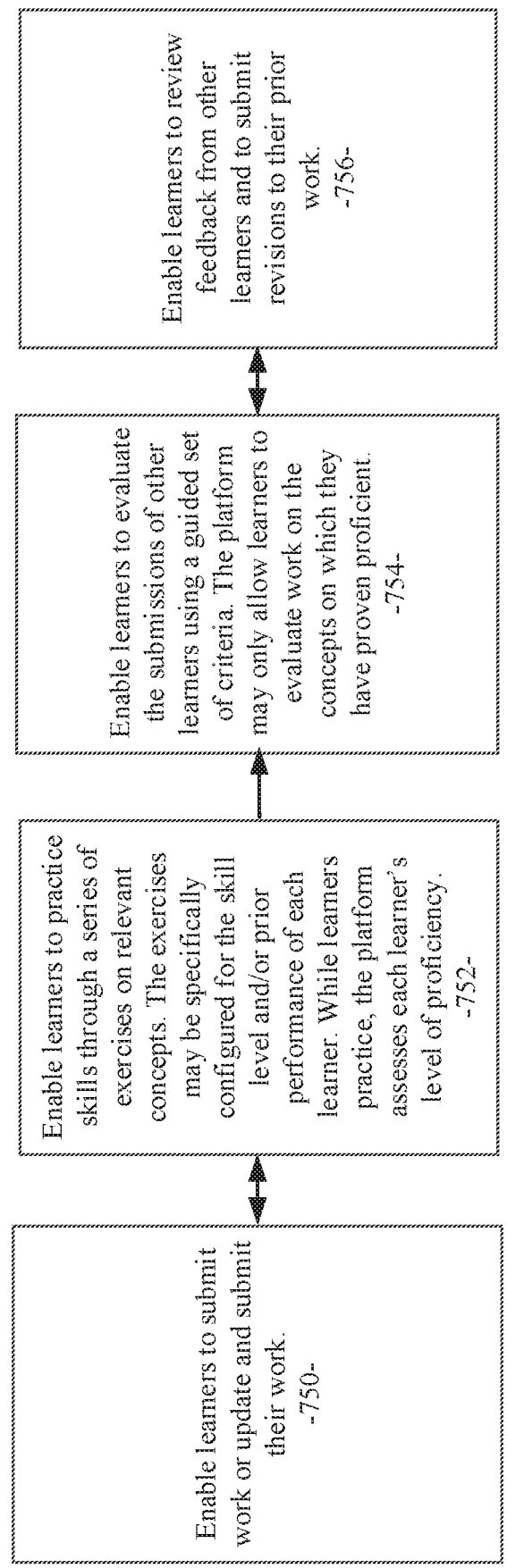
FIG. 7 illustrates the basic steps of an example embodiment of the proficiency-driven feedback and improvement platform.

In various example embodiments, through the proficiency-driven feedback and improvement system 200, learners are guided through the process of submitting and/or editing work, practicing concepts that help them strengthen a particular skill or set of skills, evaluating the work of other learners (e.g., submitting input on a binary, ternary, or Likert scale, annotating or highlighting work, and submitting free-form comments), receiving feedback from other learners, and/or revising their own work as necessary. As shown in FIG. 7, an example embodiment of the basic steps in this process:
- enables learners to submit work or update and submit their work (process block 750).
- enables learners to practice skills through a series of exercises on relevant concepts. The exercises may be specifically configured for the skill level and/or prior performance of each learner. While learners practice, the platform assesses each learner's level of proficiency (process block 752).
- enables learners to evaluate the submissions of other learners using a guided set of criteria. The platform may only allow learners to evaluate work on the concepts on which they have proven proficient (process block 754).
- enables learners to review feedback from other learners and to submit revisions to their prior work (process block 756).

Figure 8:
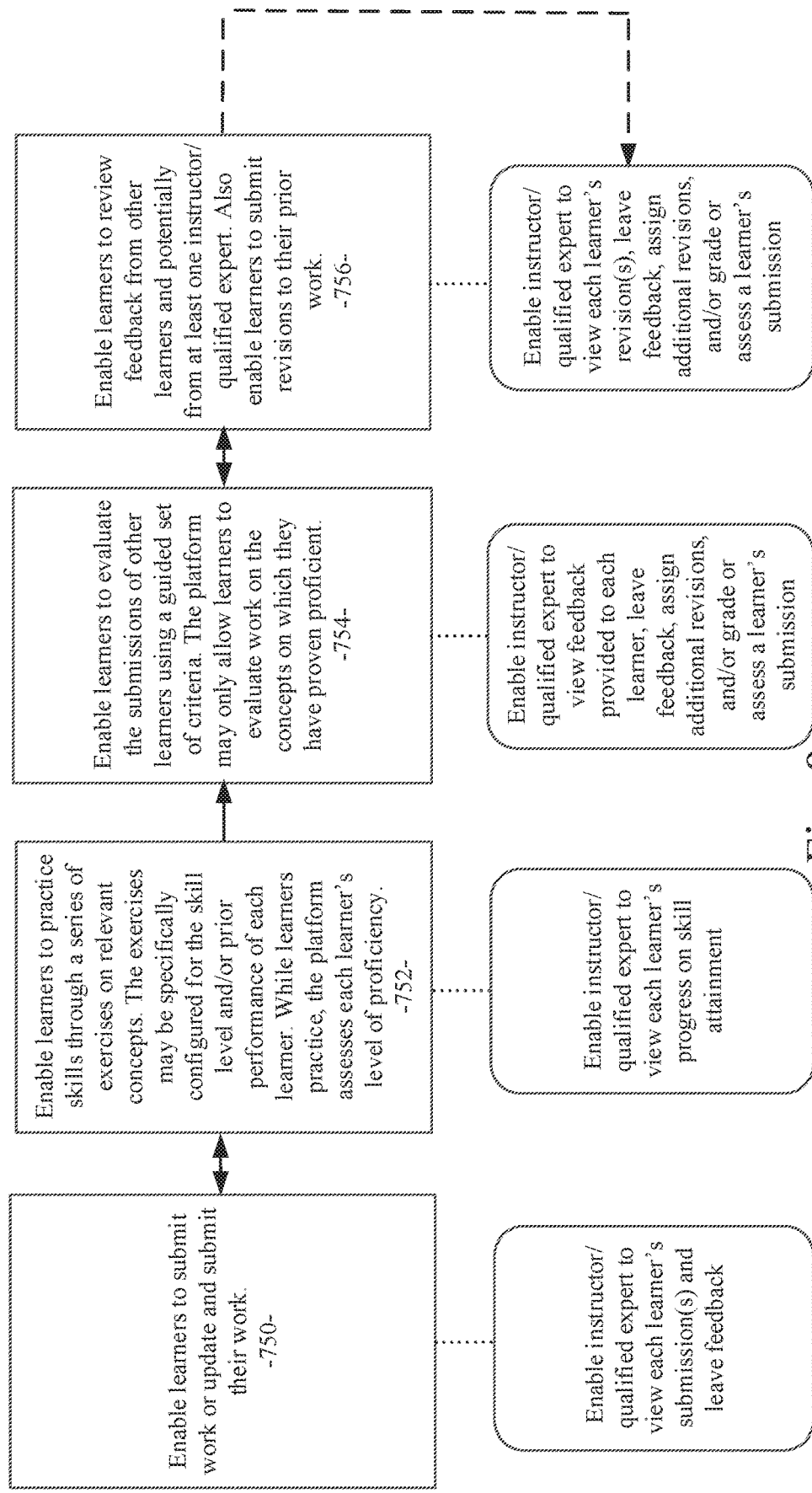
FIG. 8 illustrates the basic steps of another example embodiment of the proficiency-driven feedback and improvement platform.

As shown in FIG. 8, in various example embodiments of the proficiency-driven feedback and improvement system 200, instructors/qualified experts are able to monitor learners' work and progress on skill attainment, offer feedback, view feedback provided by other learners, and assign revisions and/or grade submissions. In various example embodiments, instructors/qualified experts can create and configure customized assignments, enter or select prompts, and/or select criteria for assessing learners and/or specific skills to assess using the proficiency-driven feedback and improvement process, using the proficiency-driven feedback and improvement system 200, via the user interface of a user platform 140.

Referring again to FIG. 3, the proficiency-driven feedback and improvement system 200 may include a proficiency-driven feedback module 230. The proficiency-driven feedback module 230 may be configured to perform the processing as described herein. Initially, the proficiency-driven feedback module 230 may be configured to establish a data connection with at least one of the plurality of learner user devices 120, at least one of the plurality of instructor/qualified expert devices 130, and optionally one or more of the plurality of online instructional resources 135. The proficiency-driven feedback module 230 may be configured to generate and display on a user interface of a user platform 140 information content and at least one user-selectable input object or icon associated with available user-selectable option elements of a pre-defined set of user-selectable option elements as described in more detail below.

In many example embodiments, a proficiency-driven feedback and improvement process may also be used as part of the proficiency-driven feedback and improvement system 200. The proficiency-driven feedback module 230, provided for this purpose, may be configured to determine and enforce a policy wherein a learner can only evaluate or provide feedback on those criteria on which he or she has demonstrated proficiency, helping to ensure that learners receive accurate and high-quality feedback. Proficiency can be evaluated using a variety of different techniques and processes as described herein.

In FIG. 9 and other example embodiments of the proficiency-driven feedback and improvement system 200, in order to demonstrate proficiency on a criterion, a learner must demonstrate proficiency on each topic associated with that criterion and all codes and counter-codes associated with each topic. If a learner has not demonstrated proficiency on all topics associated with a criterion, that criterion may be removed from the learner's peer evaluation experience. In FIG. 9, for example, a learner who has demonstrated proficiency on topics 1-4, 6, and 7, but not topic 5, may be enabled to provide feedback to other learners on criterion 1 and 2, but not on criterion 3.

In some embodiments of the process implemented by proficiency-driven feedback module 230, learners evaluate their own work using the same criteria that they would use to evaluate the work of other learners. These embodiments may be configured such that learners must evaluate their own work before the proficiency-driven feedback module 230 reveals feedback on their work from other learners. Some example embodiments of the proficiency-driven feedback and improvement system 200 maintain a visually consistent experience and/or utilize similar language across the practice and evaluation phases, maximizing the transference of skills from practice to evaluation of other learners to self-evaluation.

As configured and directed by the user via a computer-generated user interface as described herein, various example embodiments may automatically: 1) present and enable selection and configuration of a plurality of criteria; 2) present and enable configuration and selection of a plurality of prompt options or other guiding questions; 3) manage a variety of other operations related to the generation, configuration, and execution of a system and method for implementing a computer proficiency-driven feedback and improvement platform. In various example embodiments, the computer-generated user interface can be illustrated in several screen snapshots as illustrated herein and described below.

Figures 10, 11:
FIGS. 10 through 13 illustrate various example user interface screen snapshots that show some basic elements of the user interface for displaying data and receiving user inputs associated with the proficiency-driven feedback and improvement system in an example embodiment.

FIGS. 10 through 13 illustrate various example user interface screen snapshots, implemented as a web application, that show the basic elements of the user interface for displaying data and receiving user inputs associated with the proficiency-driven feedback and improvement system 200 in an example embodiment. Referring to FIGS. 10 and 11, a sample user interface of an example embodiment is shown. Under the direction of the proficiency-driven feedback and improvement system 200 of an example embodiment, a user/learner can be prompted with any of a customized set of questions and may respond with answers by interacting with the input objects as shown in FIGS. 10 and 11. The examples shown in FIGS. 10 and 11 are described in more detail below.

| Learner Practice Experience | Learner Feedback Experience |
| --- | --- |
| Example 1 | See FIG. 11 |
| see FIG. 10 | |
| Instructions: Is the thesis a fact or an opinion? | Instructions: Is the thesis a fact or an opinion? |
| Exercise: Thesis statement can be generated by the proficiency-driven feedback and improvement system 200 | Exercise: Thesis statement can be generated by a peer in the learner's class and electronically routed to other learners for consideration. |
| Learner action: | Learner action: |
| Select between two options: "Fact" and "Opinion" | Select between two options: "Fact" and "Opinion" |

Figure 12:
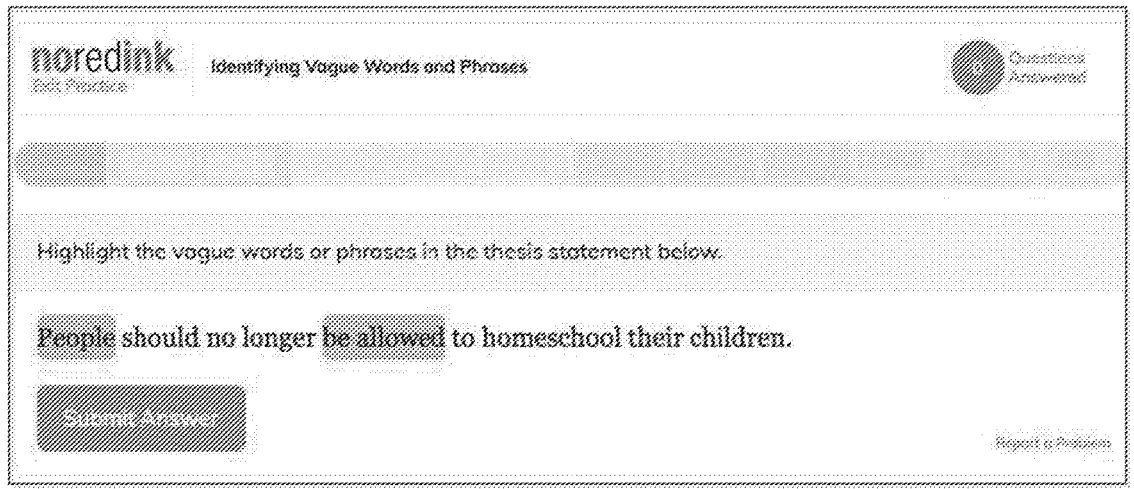
Figure 13:
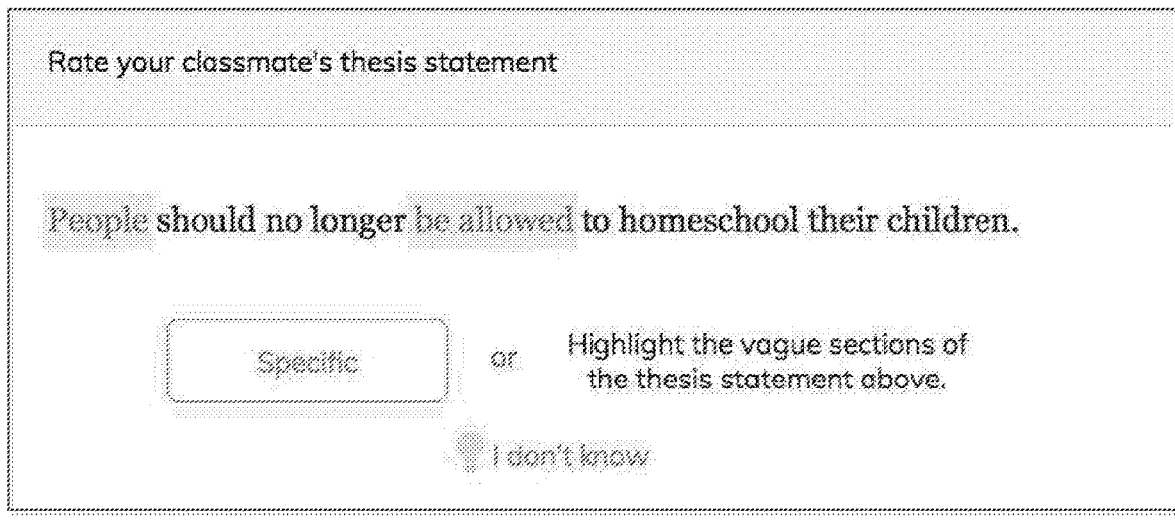

Referring to FIGS. 12 and 13, another sample user interface of an example embodiment is shown. Under the direction of the proficiency-driven feedback and improvement system 200 of an example embodiment, a user/learner can be prompted with any of a customized set of questions and may respond with answers by interacting with the input objects as shown in FIGS. 12 and 13. The examples shown in FIGS. 13 and 14 are described in more detail below.

| Learner Practice Experience | Learner Feedback Experience |
| --- | --- |
| Example 2 | See FIG. 13 |
| see FIG. 12 | |
| Instructions: Highlight the vague words or phrases in the thesis statement below | Instructions: Highlight the vague sections of the thesis statement above |
| Exercise: Thesis statement can be generated by the proficiency-assessment module 210 | Exercise: Thesis statement can be generated by another peer in the learner's class |
| Learner Action: | Learner Action: |
| Click to highlight vague words in the thesis statement | Click to highlight vague words in the thesis statement |

It will be apparent to those of ordinary skill in the art in view of the disclosure herein that the web app implementation of the example user interfaces shown in FIGS. 10 through 13 can be similarly implemented as a mobile application (app) interface or an interface for other interactive devices. The web app and the mobile app of various example embodiments can have a similar software architecture, which is described for various example embodiments herein.

Figure 14:
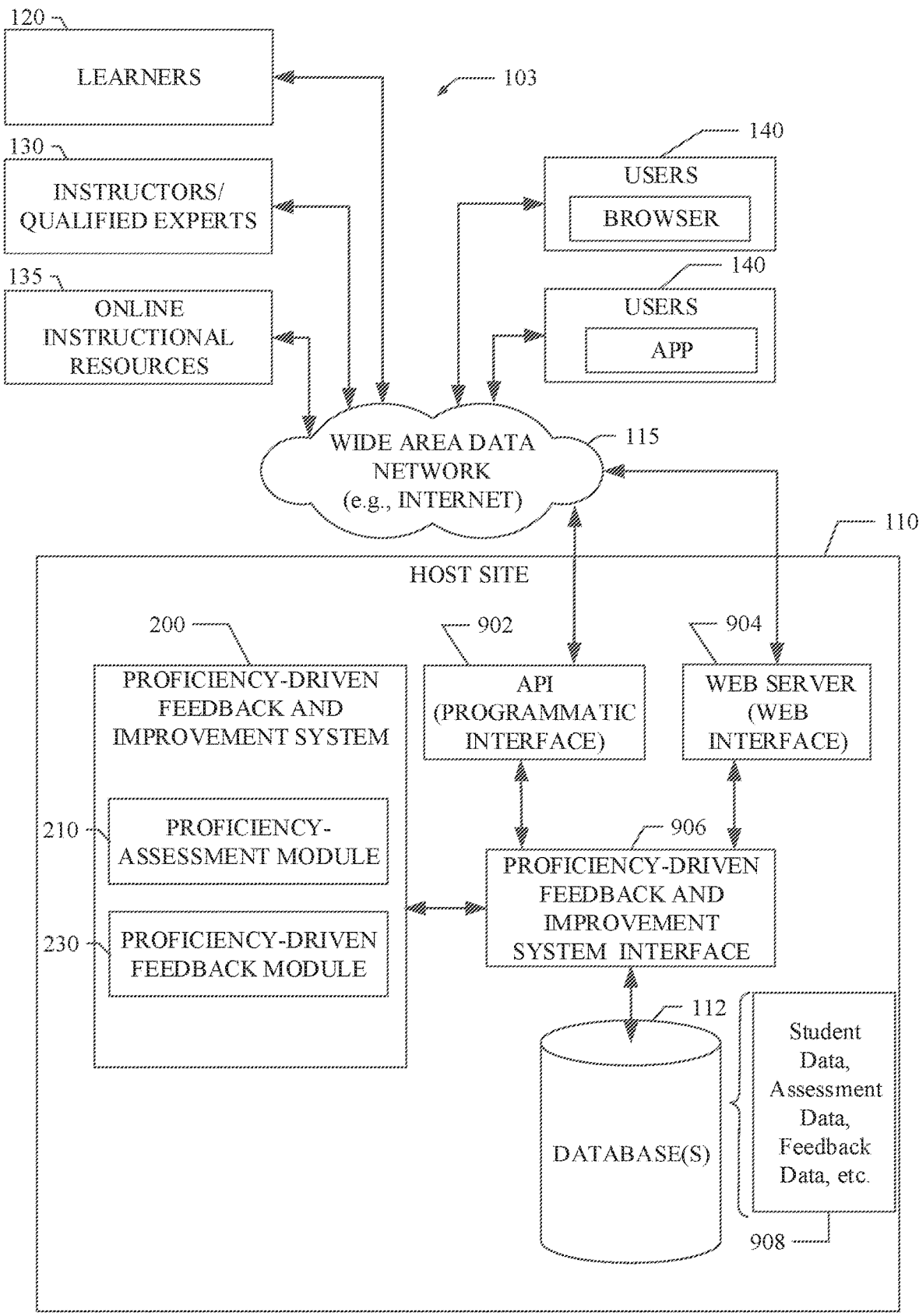
FIG. 14 illustrates another example embodiment of a networked system in which various embodiments may operate.

Referring now to FIG. 14, another example embodiment 103 of a system in which various embodiments may operate is illustrated. In the embodiment illustrated, the host site 110 is shown to include the proficiency-driven feedback and improvement system 200. The proficiency-driven feedback and improvement system 200 is shown to include the functional components 210 and 230, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities or resources on a programmatic or automated data transfer level. The API 902 and web interface 904 may be configured to interact with the proficiency-driven feedback and improvement system 200 either directly or via an interface 906. The proficiency-driven feedback and improvement system 200 may be configured to access a database 112 either directly or via the interface 906.

Figure 15:
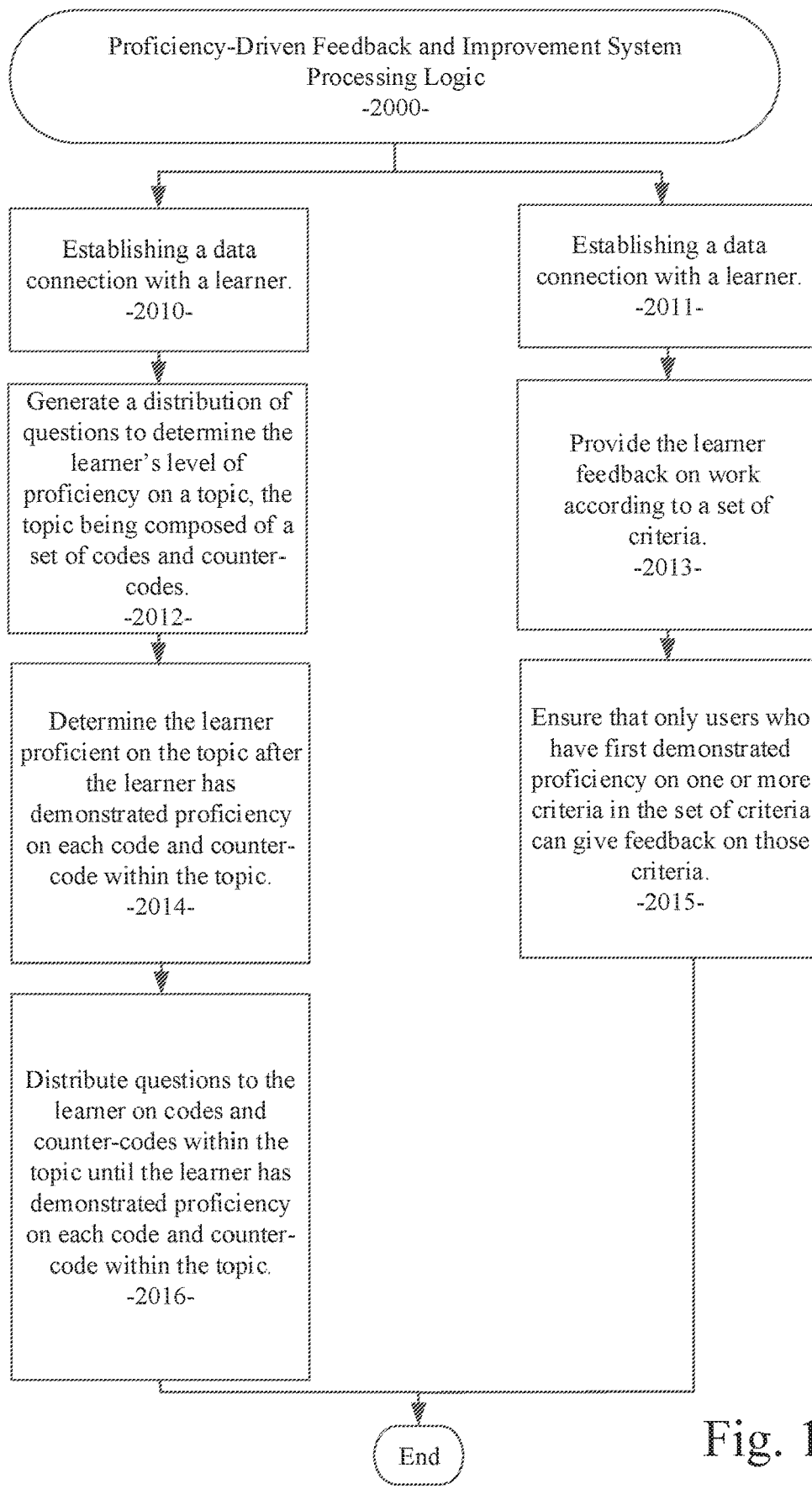
FIG. 15 illustrates a processing flow diagram that shows an example embodiment of a method as described herein.

Referring now to FIG. 15, a processing flow diagram illustrates an example embodiment of a method implemented by the proficiency-driven feedback and improvement system 200 as described herein. The method 2000 of an example embodiment includes: establishing, by use of a data processor, a data connection with a learner (processing block 2010); generating a distribution of questions to determine the learner's level of proficiency on a topic, the topic being composed of a set of codes and counter-codes (processing block 2012); determining the learner proficient on the topic after the learner has demonstrated proficiency on each code and counter-code within the topic (processing block 2014); and distributing questions to the learner on codes and counter-codes within the topic until the learner has demonstrated proficiency on each code and counter-code within the topic (processing block 2016). The method 2000 of an example embodiment further includes: establishing, by use of a data processor and a data network, a network data connection with a learner (processing block 2011); providing the learner feedback on work according to a set of criteria (processing block 2013); and ensuring that only users who have first demonstrated proficiency on one or more criteria in the set of criteria can give feedback on those criteria (processing block 2015).

Figure 16:
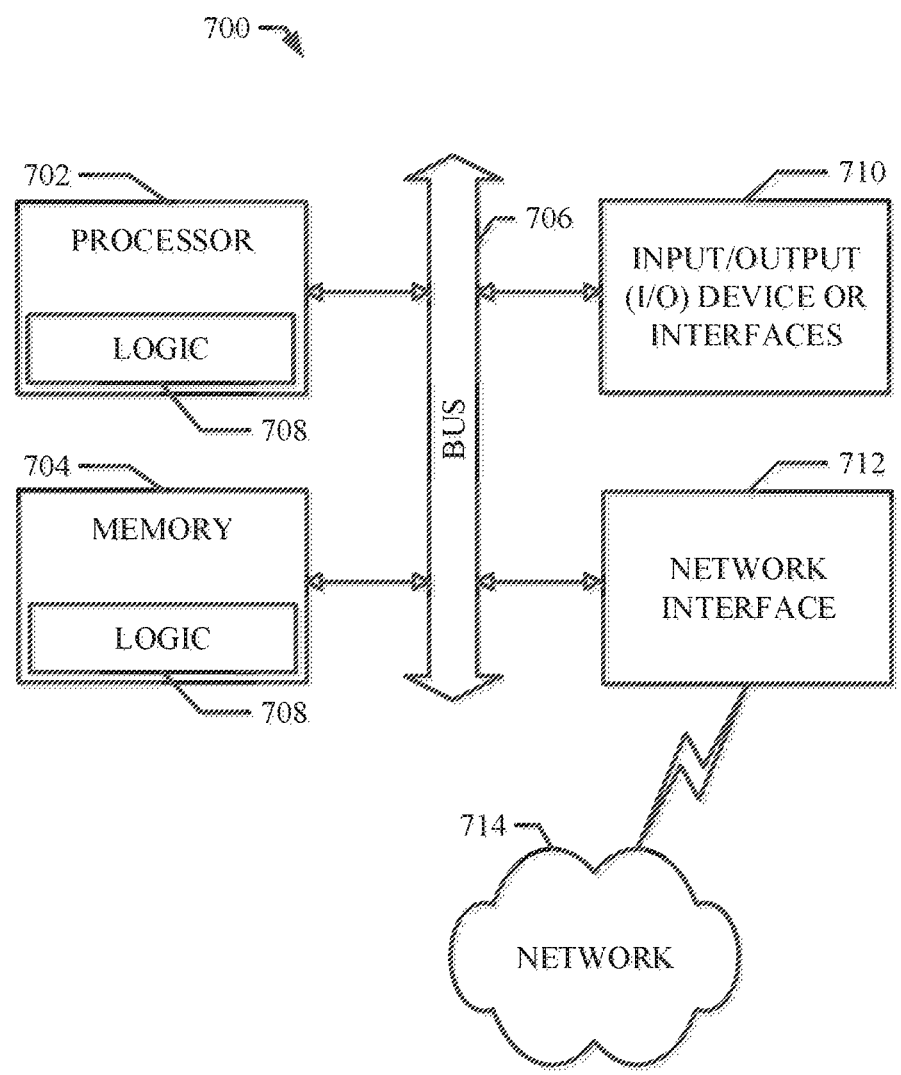
FIG. 16 shows a diagrammatic representation of a machine in the example form of a computer system within which a set of instructions when executed may cause the machine to perform any one or more of the methodologies described herein.

FIG. 16 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for implementing a proficiency-driven feedback and improvement platform are disclosed. In various example embodiments, a software application program is used to enable the development and presentation of information categories, information sub-categories, and information components in customizable views on the display screen of a computing or communication system, including mobile devices. As described above, in a variety of contexts, the proficiency-driven feedback and improvement system 200 of an example embodiment can be configured to automatically obtain a variety of information from one or more 3rd party sites or network resources via a data network to facilitate the user experience of searching for desired information datasets, configuring a proficiency-driven feedback and improvement platform, and sharing information, all from the convenience of a computing device or a portable electronic device, such as a smartphone. This collection of particular user-selected information datasets and customized views has traditionally been possible only via multiple, personal interactions with a plurality of different parties at different locations. The embodiments as presently disclosed and claimed enable these disparate transactions to be integrated into a single set of electronic interactions with a mobile device or other computing device. As such, the various embodiments as described herein are necessarily rooted in computer and network technology and serve to improve these technologies when applied in the manner as presently claimed. In particular, the various embodiments described herein improve the use of computing device technology and mobile device technology in combination with data network technology in the context of a proficiency-driven feedback and improvement platform via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for network-enabled proficiency-driven feedback and improvement for learners, the method comprising:
    establishing, by use of a data processor and a data network, a data connection with a learner;
    generating a distribution of questions to determine the learner's level of proficiency on a topic, the topic being composed of a set of codes and counter-codes, the codes of the set of codes and counter-codes corresponding to sub-skills of the topic, the counter-codes of the set of codes and counter-codes being juxtaposing sub-skills of a corresponding code;
    determining the learner proficient on the topic after the learner has demonstrated proficiency on each code and counter-code within the topic by correctly answering a pre-determined threshold of questions presented on each code and counter-code within the topic; and
    distributing questions to the learner via the data processor and the data network on each of the codes and counter-codes within the topic until the learner has demonstrated proficiency on each code and counter-code within the topic, the distributing including presenting a more difficult next question to the learner for a particular code or counter-code when the learner correctly responds to a previous question in the particular code or counter-code, the distributing including presenting a less difficult next question to the learner for the particular code or counter-code when the learner incorrectly responds to the previous question in the particular code or counter-code, the distributing including presenting to the learner a mix of questions both from codes and counter-codes in which the learner has demonstrated proficiency and questions from codes and counter-codes in which the learner has not demonstrated proficiency.

2. The method of claim 1 including identifying proficient users who have demonstrated proficiency on one or more criteria in a set of criteria and enabling the proficient users to provide feedback for the learner according to the set of criteria.

3. The method of claim 2 including enabling the proficient users to provide feedback for the learner by submitting input on a binary, ternary, or Likert scale, annotating or highlighting work, or submitting free-form comments.

4. The method of claim 2 including enabling the proficient users to provide feedback for the learner by responding to prompts presented to the proficient users, the prompts requesting specific evaluations of the learner's proficiency on the one or more topics.

5. The method of claim 2 including enabling the proficient users to provide feedback for the learner by presenting to the proficient users a view of the work completed by the learner, a view of the proficiencies demonstrated by the learner, and a view of feedback provided by other proficient users.

6. The method of claim 2 including enabling the proficient users to provide feedback for the learner by enabling the proficient users to assign revisions to the learner, grade submissions of the learner, or create an assignment for the learner.

7. The method of claim 1 including creating an assignment containing the questions distributed to the learner to determine the learner's proficiency on one or more topics.

8. The method of claim 1 including enabling the learner to create an assignment containing the questions distributed to the learner to enable the learner to determine their own proficiency on one or more topics.

9. The method of claim 1 wherein the questions distributed to the learner correspond to the learner's prior proficiency on the codes and counter-codes corresponding to each topic.

10. The method of claim 1 wherein the questions distributed to the learner correspond to the predetermined threshold for demonstrating proficiency on each code and counter-code.

11. The method of claim 1 wherein the questions distributed to the learner correspond to a relative frequency for assessing each code and counter-code.

12. The method of claim 1 wherein the questions distributed to the learner correspond to a difficulty of questions available on each code and counter-code.

13. The method of claim 1 wherein the questions distributed to the learner correspond to a grouping of codes and their counter-codes within each topic.

14. The method of claim 1 including using a randomizing function to determine to which code or counter-code a next question of the questions distributed to the learner corresponds.

* * * * *